ns (, 1981

United States Patent [19]
Zaets et al.

[11] 4,256,490
[45] Mar. 17, 1981

[54] COMPOSITION FOR DIFFUSION COATING OF FERROUS METALS

[76] Inventors: Inna I. Zaets, ulitsa Vorobieva, 11, kv. 8; Ivan D. Zaitsev, ulitsa Ekonomicheskaya, 1, kv. 31, both of Kharkov; Olga K. Yakshina, ulitsa 16 Parkovaya, 55, korpus 2, kv. 130; Nina F. Pershina, Kutuzovsky prospekt, 2/1, kv. 111, both of Moscow; Anatoly K. Gorbachev, prospekt Lenina, 31a, kv. 19; Ivan N. Gladky, ulitsa Bairona, 175, kv. 101, both of Kharkov; Nikolai M. Davydenko, ulitsa Komandarma Uborevicha, 14, kv. 45; Grigory A. Tkach, ulitsa Frunze, 15, kv. 8, both of Kharkov, all of U.S.S.R.

[21] Appl. No.: 62,128

[22] Filed: Jul. 30, 1979

[51] Int. Cl.$^3$ .............................................. C09D 5/08
[52] U.S. Cl. .................. 106/1.12; 106/1.25; 106/14.05; 427/376.3; 427/376.5
[58] Field of Search .................. 106/1.12, 1.25, 14.05; 75/0.5 R; 427/376 B, 376 D, 376.3, 376.5

[56] References Cited

U.S. PATENT DOCUMENTS

| 2,988,515 | 6/1961 | Wachtel | 252/301.4 |
| 3,096,205 | 7/1963 | DeGuisto | 106/1.12 |
| 3,600,201 | 8/1971 | Alessi | 427/376 B |

*Primary Examiner*—Lorenzo B. Hayes
*Attorney, Agent, or Firm*—Lackenbach, Lilling & Siegel

[57] ABSTRACT

A composition for diffusion coating ferrous metals containing a particulate mixture of titanium in an amount of from 51.5 to 64.0% by weight, chromium in an amount of 17.5 to 24.0% by weight, alumina in an amount of from 15.0 to 21.25% by weight, ammonium halide in an amount of 1.5 to 2.0% by weight, molybdenum in an amount of 0.75 to 1.5% by weight and boron in an amount of 1.0 to 2.0% by weight.

5 Claims, No Drawings

COMPOSITION FOR DIFFUSION COATING OF FERROUS METALS

BACKGROUND OF THE INVENTION

1. Field of the Invention

The present invention relates to protection of metals against corrosion, and particularly to compositions intended for diffusion coating ferrous metals. Most advantageously the invention can be used for corrosion protection of parts and assemblies of the equipment used in chemical industries for the production of soda and soda products as well as magnesium chloride, barium chloride, sodium sulphates and other products of this kind.

2. Description of the Prior Art

One of the main problems facing manufacturers of chemical apparatus consists is providing of high corrosion and erosion resistance in apparatus parts contacting highly concentrated salt solutions. Experience proves that this problem has not been solved up till now.

It is well known that for the production of chemical apparatus parts having corrosion resistant coatings, cast iron and carbonaceous steels are more preferable from the economical point of view than high-cost titanium. The best results are obtained when employing chromium, titanium and their compounds in the compositions intended for protective coatings. Investigations have shown that high density of the protective layer and its strong bond with the substrate are provided by a diffusion saturation of the surface of apparatus parts with these elements and their compounds.

Known in the art as a composition for diffusion coating ferrous metals as described in U.S.S.R. Inventor's Certificate No. 443,941. The above composition comprises a particulate mixture of titanium dioxide, chromium oxide, aluminum, aluminum fluoride and alumina taken in the following ratio (in % by weight):

| titanium dioxide | 10 to 15 |
| --- | --- |
| chromium oxide | 23 to 26 |
| aluminum | 9 to 27 |
| aluminum fluoride | 3 to 5 |
| alumina | the balance |

To form a protective coating upon workpieces, the latter are embedded into the above composition, heated to a temperature of 950° to 1000° C. and held at this temperature until a diffusion layer is formed. Such a coating effectively protects the substrate (of workpieces) against oxidation, gas corrosion and the influence of low-corrosive liquid media such as sea water. However in chloride containing media and in highly concentrated salt solutions the resistance of the coating is not satisfactory, which is due to the fact that aluminum can be easily corroded from the coating. In this case, selective corrosion takes place which deteriorates the continuity of the coating. In addition, the activity of the chemically bound titanium and chromium is not high which is due to a low content of these elements on the surface of the diffusion layer.

There is also known a composition for diffusion coating ferrous metals, providing for higher corrosion resistance described in U.S. Pat. No. 2,988,515. This composition comprises a particulate mixture of titanium, chromium, alumina and ammonium halide. The above ingredients are taken in the following ratio (in % by weight):

| titanium | 5 to 30 |
| --- | --- |
| chromium | 10 to 50 |
| alumina | 15 to 45 |
| ammonium halide | 10 |

When employing the composition described above, the diffusion coating on the surface of the ferrous metals is formed in the course of heating the workpieces in an atmosphere of inert gas (argon). At a temperature of 900° to 1100° C. there takes place diffusion saturation of the surface layer of carbonaceous steel with titanium and chromium. Titanium forms carbides with the carbon of the substrate. It is these carbides which substantially provide the corrosion-resisting properties of the coating.

An obvious advantage of the composition described above is that a coating made therewith does not suffer from selective corrosion. In addition, free titanium and chromium are more active in diffusion saturation and their concentration in the protecting layer is much higher than that found in the priod art described earlier. However, this composition is not always efficient either. Particularly, coatings obtained with the aid of this composition are not sufficiently resistant in highly concentrated salt solutions and in chloride containing media, which is caused by the quality of the ingredients and their ratio in the composition. Thus, a comparatively low content of titanium in the mixture (up to 30% by weight) does not permit a continuous layer of carbides and a high concentration of titanium in the surface layer to be obtained. Any considerable increase in the content of titanium in the composition produce no better results, because of a large amount of chromium (weight ratio between chromium and titanium is 2:10) which binds the substrate carbon, thereby inhibiting diffusion and formation of titanium carbides. Chromium carbides contained in a large amount in the diffusion coating makes the coating highly fragile and causes microcracks therein. This is extremely unadvisable when protecting apparatus components operating in corrosive liquid media, such as pump impellers, valves, and screens. Over a period of time, insufficient density and continuity of the diffusion layer result in a pitting corrosion and destruction of the coating. This process proceeds much faster at temperatures of corrosive media from 70° to 95° C. It is to be noted that the temperature range often coincides with the parameters of the production processes for producing such products as magnesium chloride, sodium sulphate, Solvay soda, and barium chloride.

SUMMARY OF THE INVENTION

The principal object of the present invention is to provide a composition for diffusion coating ferrous metals, to ensure efficient corrosion protection of apparatus parts in highly concentrated salt solutions and chloride containing media.

One more important object of the present invention is to provide a composition which permits making a diffusion coating with a continuous layer of titanium carbides.

Another object of the present invention is to provide a composition for diffusion coating ferrous metals which permits the concentration of titanium in the surface layer be considerably increased.

One more object of the present invention is to improve the plasticity and to reduce the fragility of the diffusion coating.

An additional object of the present invention is to prevent pitting corrosion of the coatings in highly concentrated salt solutions and in chloride containing media.

The above-mentioned and other objects of the present invention are attained with a composition for diffusion coating ferrous metals containing a particulate mixture of titanium, chromium, alumina and ammonium halide and, according to the invention, further contains molybedenum and boron, and said ingredients being in the following ratio (in % by weight):

| titanium | 51.5 to 64.0 |
|---|---|
| chromium | 17.5 to 24.0 |
| alumina | 15.0 to 21.25 |
| ammonium halide | 1.5 to 2.0 |
| molybdenum | 0.75 to 1.5 |
| boron | 1.0 to 2.0 |

With such ratio of titanium and chromium in the composition it is possible to provide a high concentration of titanium on the surface of the diffusion layer and at the same time a continuous layer of titanium carbides. The introduction of molybdenum and chromium also assists in making a high-quality diffusion layer. Specifically, boron which is a more active carbide-forming element than chromium makes it possible, in combination with molybdenum, to compact the diffusion layer and to improve its plasticity. In addition, molybdenum considerably increases the passivating power of the coating. The above factors increase the corrosion resistance of the coating in highly concentrated salt solutions and chloride containing media, prevent pitting corrosion and microcracks in the coatings of both statically and dynamically loaded apparatus parts.

Experiments have shown that such positive results can be attained with the above ratio of ingredients only.

DETAILED DESCRIPTION OF THE INVENTION

Now the invention will be described by way of specific examples thereof.

EXAMPLE 1

A composition for diffusion coating ferrous metals is obtained in the following way. Titanium, chromium, alumina, crystalline ammonium halide, (ammonium chloride), molybdenum and boron, all in the powder form, are taken as initial ingredients. Particles of the metallic powders range in size from 0.8 to 1.5 mm. Alumina and ammonium chloride are taken in powder form with particles of said substances having different dispersion characteristics ranging from a dust-like fraction to particles sizing 1.5 mm. The initial ingredients are taken in the following ratio (% by weight):

| titanium | 64.0 |
|---|---|
| chromium | 17.5 |
| alumina | 15.0 |
| ammonium chloride | 1.5 |
| molybdenum | 0.75 |
| boron | 1.25 |

At first, titanium powder and chromium powder are mixed together. Then molybdenum, boron, ammonium chloride and alumina are added into the obtained mixture, whereupon the above ingredients are stirred until a homogeneous mixture is obtained.

With the composition obtained the diffusion layer on the workpieces such as parts of pump casings and parts of housings for column apparatus intended for the production of soda and made of 2.5% carbon content cast iron is formed in the following way.

A hermetically sealed container of stainless steel is loaded with workpieces, and then filled with the composition of the invention. The container is closed, placed into the furnace and heated up to a temperature of 1000° C. At this temperature the contents of the container are held for 8 hours. In the course of heating and holding, a continuous plastic diffusion layer having a total thickness of 0.16 to 0.20 mm is formed on the surface of the workpiece. After holding, the container with the treated workpieces is air-cooled.

Similarly, samples together with said workpieces were treated in the same container in order to form a diffusion layer on their surface. The samples were made of gray cast-iron containing 2.5% C and were 65×15×3 mm rectangular plates. After the diffusion layer has been formed, the samples were subjected to X-ray analysis in order to determine the nature of phases constituting the diffusion layer, and hardness, continuity and corrosion resistance of said layer were determined by the methods described below. The layer hardness was determined by the Vickers method (HV kg/mm$^2$). Continuity of the layer was determined by means of Wocker reagent (a mixture of $K_3[Fe(CN)_6]$ and NaCl). Filter paper moistened with said reagent was placed onto the surface of the samples in the pore zones. Ions of iron with ions of $[Fe(CN)_6]^{3-}$ formed the compound $[Fe_3 Fe(CN)_6]$ known as Turnbull's blue. Location of pores was fixed on the filter paper by blue spots.

Corrosion resistance of the layer was determined in the following way. The samples were immersed into solutions of salts and held therein for 1200 hours, the temperature of the solution being 95° C. Corrosion resistance was evaluated as a decrease in sample weight per unit surface area, taking into account the test duration. Corrosion magnitude was determined in mm/year, taking into account the specific weight of the material.

Test results appeared to be as follows:

| | |
|---|---|
| Vickers hardness of the diffusion layer HV, kg/mm$^2$ | 950 |
| layer continuity, number of spots per cm$^2$ | 0 |
| corrosion resistance, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 2

A composition for a diffusion coating of ferrous metals is obtained in the following way. Titanium, chromium, alumina, crystalline ammonium halide (ammonium chloride), molybdenum and boron, all in powder form, are taken as initial ingredients. Particles of the metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (% by weight):

|   |   |
|---|---|
| titanium | 51.5 |
| chromium | 24.0 |
| alumina | 20.0 |
| ammonium chloride | 2.0 |
| molybdenum | 1.5 |
| boron | 1.0 |

At first, titanium powder and chromium powder are mixed together. Then molybdenum, boron, ammonium chloride and alumina are added into the obtained mixture, whereupon the above ingredients are stirred until a homogeneous mixture is obtained.

With the composition obtained the diffusion layer on workpieces such as parts of pump casings and parts of housings for column apparatus intended for the production of soda and made of 3.57% carbon content cast iron is formed in the following way.

A hermetically sealed container of stainless steel is loaded with workpieces and then filled with the composition of the invention. The container is closed, placed into the furnace and heated up to a temperature of 950° C. At this temperature the container contents are held for 8 hours. In the course of heating and holding, a continuous plastic diffusion layer having a total thickness of 0.1 mm is formed on the surface of the workpiece. After holding, the container with the treated workpieces is air-cooled.

Similarly, samples together with said workpieces were treated in the same container in order to form a diffusion layer on their surface. The samples were made of cast-iron castings containing 3.57% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

|   |   |
|---|---|
| Vickers hardness of the diffusion layer, HV, kg/mm$^2$ | 1050 |
| layer continuity, number of spots per cm$^2$ | 0 |
| corrosion resistance, mm/year: | |
| in sodium chloride (310 g/l) | 0.003 |
| in magnesium chloride (250 g/l) | 0.002 |
| in barium chloride (263 g/l) | 0.002 |
| in ammonium chloride (271 g/l) | 0.006 |
| in sodium sulphate (250 g/l) | 0.002 |
| in potassium sulphate (200 g/l) | 0.003 |
| in sodium carbonate (178 g/l) | 0.002 |
| in potassium carbonate (100 g/l) | 0.002 |
| in sodium bicarbonate (88 g/l) | 0.001 |

EXAMPLE 3

A composition for diffusion coating ferrous metals is obtained in the following way. Titanium, chromium, alumina, ammonium halide (ammonium iodide), molybdenum and boron, all in powder form, are taken as initial ingredients. Particles of the metallic powders range in size from 0.8 to 1.5 mm. Alumina and ammonium iodide are taken in powder form with particles of said substances having different dispersion characteristics and ranging from a dust-like fraction to particles sizing 1.5 mm. The initial ingredients are taken in the following ratio (% by weight):

|   |   |
|---|---|
| titanium | 55.0 |
| chromium | 24.0 |
| alumina | 16.5 |
| ammonium iodide | 1.5 |
| molybdenum | 1.5 |
| boron | 1.5 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition the diffusion layer on workpieces such as parts of pump casings and parts of housings for column apparatus intended for the production of soda and made of 3.75% carbon content cast iron is formed in the following way. A hermetically sealed container of stainless steel is loaded with workpieces and then filled with the composition of the invention. The container is closed, placed into the furnace and heated to a temperature of 950° C. At this temperature the contents are held for 8 hours. In the course of heating and holding, a continuous plastic diffusion layer having a total thickness of 0.1 mm is formed on the surface of the workpiece. After holding, the container with the treated workpieces is air-cooled.

Similarly, samples together with said workpieces were treated in the same container in order to form a diffusion layer on their surface. The samples were made of cast-iron castings containing 3.57% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

|   |   |
|---|---|
| Vickers hardness of the diffusion layer HV, kg/mm$^2$ | 1050 |
| layer continuity, number of spots per cm$^2$ | 0 |
| corrosion resistance, mm/year: | |
| in sodium chloride (310 g/l) | 0.002 |
| in magnesium chloride (250 g/l) | 0.002 |
| in barium chloride (263 g/l) | 0.003 |
| in ammonium chloride (271 g/l) | 0.005 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 4

A composition for diffusion coating ferrous metals is obtained in the following way. Titanium, chromium, alumina, ammonium halide (ammonium bromide), molybdenum and boron, all in the powder form, are taken as initial ingredients. Particles of the metallic powders range in size from 0.8 to 1.5 mm. Alumina and ammonium bromide are taken in powder form with particles of said substances having different dispersion characteristics and ranging from a dust-like fraction to particles sizing 1.5 mm. The initial ingredients are taken in the following ratio (% by weight):

| | |
|---|---|
| titanium | 60.0 |
| chromium | 20.0 |
| alumina | 15.5 |
| ammonium bromide | 1.5 |
| molybdenum | 1.0 |
| boron | 2.0 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition the diffusion layer on workpieces such as parts of pump casings and parts of housings for column apparatus intended for the production of soda and made of 3.75% carbon content cast iron is formed in the following way. A hermetically sealed container of stainless steel is loaded with workpieces and then filled with the composition of the invention. Then the container is closed, placed into the furnace and heated to a temperature of 950° C. At this temperature the container contents are held for 8 hours. In the course of heating and holding, a continuous plastic diffusion layer having a total thickness of 0.1 mm is formed on the surface of the workpiece. After holding, the container with the treated workpieces is air-cooled.

Similarly, samples together with said workpieces were treated in the same container in order to form a diffusion layer on their surface. The samples were made of cast-iron castings containing 3.57% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm$^2$ | 950 |
| layer continuity, number of spots per cm$^2$ | 0 |
| corrosion resistance, mm/year: | |
| in sodium chloride (310 g/l) | 0.002 |
| in magnesium chloride (250 g/l) | 0.002 |
| in barium chloride (263 g/l) | 0.003 |
| in ammonium chloride (271 g/l) | 0.005 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 | cles sizing 1.5 mm. The initial ingredients are taken in the following ratio (% by weight):

| | |
|---|---|
| titanium | 62.5 |
| chromium | 18.0 |
| alumina | 15.0 |
| ammonium fluoride | 1.5 |
| molybdenum | 1.0 |
| boron | 2.0 |

At first, titanium powder and chromium powder are mixed together. Then molybdenum, boron, ammonium fluoride and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of 3.75% carbon content cast iron is formed in the following way.

A hermetically sealed container of stainless steel is loaded with workpieces and filled with the composition of the invention. The container is closed, placed into the furnace and heated to a temperature of 950° C. At this temperature the container contents are held for 8 hours. In the course of heating and holding, a continuous plastic diffusion layer having a total thickness of 0.1 mm is being formed on the surface of the workpiece. After holding, the container with the workpieces treated is air-cooled.

Similarly, samples together with said workpieces were treated in the same container in order to form a diffusion layer on their surface. The samples were made of cast-iron castings containing 3.57% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm$^2$ | 980 |
| layer continuity, number of spots per cm$^2$ | 0 |
| corrosion resistance, mm/year: | |
| in sodium chloride (310 g/l) | 0.002 |
| in magnesium chloride (250 g/l) | 0.002 |
| in barium chloride (263 g/l | 0.002 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 5

A composition for diffusion coating ferrous metals is obtained in the following way. Titanium, chromium, alumina, ammonium halide (ammonium fluoride), molybdenum and boron, all in powder form, are taken as initial ingredients. Particles of the metallic powders range in size from 0.8 to 1.5 mm. Alumina and ammonium fluoride are taken in the powder form with particles of said substances having different dispersion characteristics and ranging from a dust-like fraction to parti-

EXAMPLE 6

A composition for diffusion coating ferrous metals is obtained in the following way. Titanium, chromium, alumina, ammonium halide (ammonium iodide), molybdenum and boron, all in the powder form, are taken as initial ingredients. Particles of the metallic powders range in size from 0.8 to 1.5 mm. Alumina and ammonium iodide are taken in the powder form with particles of said substances having different dispersion characteristics and ranging from a dust-like fraction to particles sizing 1.5 mm. The initial ingredients are taken in the following ratio (% by weight):

| | |
|---|---|
| titanium | 54.0 |
| chromium | 20.0 |
| alumina | 21.25 |
| ammonium iodide | 1.7 |
| molybdenum | 1.3 |
| boron | 1.75 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition the diffusion layer on workpieces such as parts of pump casings and parts of housings for column apparatus intended for the production of soda and made of 2.5% carbon content cast iron is formed in the following way. A hermetically sealed container of stainless steel is loaded with workpieces and filled with the composition of the invention. Then the container is closed, placed into the furnace and heated to a temperature of 1000° C. At this temperature the container contents are held for 8 hours.

In the course of heating and holding, a continuous plastic diffusion layer having a total thickness of 0.12 mm is formed on the surface of the workpiece. After holding, the container with the treated workpieces is air-cooled.

Similarly, samples together with said workpieces were treated in the same container in order to form a diffusion layer on their surface. The samples were made of grey cast iron containing 2.5% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm² | 980 |
| layer continuity, number of spots per cm² | 0 |
| corrosion resistance, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.005 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 7

A composition for diffusion coating ferrous metals is obtained in the following way. Titanium, chromium, alumina, ammonium halide (ammonium bromide), molybdenum and boron, all in the powder form, are taken as initial ingredients. Particles of the metallic powders range in size from 0.8 to 1.5 mm. Alumina and ammonium bromide are in powder form with particles of said substances having different dispersion characteristics ranging from a dust-like fraction to particles sizing 1.5 mm.

The initial ingredients are taken in the following ratio (in % by weight):

| | |
|---|---|
| titanium | 52.0 |
| chromium | 22.0 |
| alumina | 21.0 |
| ammonium bromide | 1.5 |
| molybdenum | 1.5 |
| boron | 2.0 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of 2.5% carbon content cast iron is formed in the following way. A hermetically sealed container of stainless steel is loaded with workpieces and filled with the composition of the invention. Then the container is closed, placed into the furnace and heated to a temperature of 1000° C. At this temperature the container contents are held for 8 hours. In the course of heating and holding a continuous plastic diffusion layer having a total thickness of 0.12 mm is formed on the surface of the workpiece. After holding, the container with the workpieces treated is air-cooled.

Similarly, samples together with said workpieces were treated in the same container in order to form a diffusion layer on their surface. The samples were made of grey cast iron containing 2.5% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm² | 1000 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.005 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 8

A composition for diffusion coating ferrous metals is obtained in the following way. Titanium, chromium alumina, ammonium halide (ammonium fluoride), molybdenum and boron, all in powder form, are initial ingredients. Particles of the metallic powders range in size from 0.8 to 1.5 mm. Alumina and ammonium fluoride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 62.0 |
| chromium | 18.0 |
| alumina | 16.0 |
| ammonium fluoride | 1.5 |
| molybdenum | 1.0 |
| boron | 1.5 |

At first, titanium powder and chromium powder are mixed together. Then molybdenum, boron, ammonium fluoride and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of 2.5% carbon content cast iron is formed in the following way. A hermetically sealed container of stainless steel is loaded with workpieces and filled with the composition of the invention. The container is closed, placed into the furnace and heated to a temperature of 1000° C. At this temperature the container contents are held for 8 hours. In the course of heating and holding, a continuous plastic diffusion layer having a total thickness of 0.12 mm is formed on the surface of the workpieces. After holding, the container with the treated workpieces is air-cooled.

Similarly, samples together with said workpieces were treated in the same container in order to form a diffusion layer on their surface. The samples were made of grey cast iron containing 2.5% carbon and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm$^2$ | 980 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 9

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm. Alumina and ammonium chloride are in powder form with particles of said substances having different dispersion characteristics ranging from a dust-like fraction to particles sizing 1.5 mm. The initial ingredients are taken in the following ratio (in % by weight):

| | |
|---|---|
| titanium | 63.0 |
| chromium | 17.5 |
| alumina | 15.0 |
| ammonium chloride | 1.7 |
| molybdenum | 1.5 |
| boron | 1.3 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of low-alloy cast iron containing additions of chromium, nickel and molybdenum in an amount of 2.5% is formed in the following way. A hermetically sealed container of stainless steel is loaded with workpieces and filled with the composition of the invention. The container is closed, placed into the furnace and heated to a temperature of 1000° C. At this temperature the container contents are held for 7 hours. In the course of heating and holding, a continuous plastic diffusion layer having total thickness of 0.1 to 0.12 mm is formed on the surface of the workpieces. After holding, the container with the workpieces treated is air-cooled.

Similarly, samples together with said workpieces were treated in the same container in order to form a diffusion layer on their surface. The samples were made of low-alloy cast iron containing additions of chromium, nickel and molybdenum in an amount of 2.5% and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm$^2$ | 920 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 10

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm. Alumina and ammonium iodide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 61.0 |
| chromium | 19.0 |
| alumina | 15.0 |
| ammonium iodide | 1.5 |
| molybdenum | 1.5 |
| boron | 2.0 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of low-alloy cast iron containing additions of chromium, nickel, and molybdenum in an amount of 2.5% is formed in the following way. A hermetically sealed container of stainless steel is loaded with workpieces and filled with the composition of the invention. The container is closed, placed into the furnace and heated to a temperature of 1000° C. At this temperature the container contents are held for 7 hours. In the course of heating and holding, a continuous plastic diffusion layer having total thickness of 0.1 to 1.12 mm is formed on the surface of the workpieces. After holding, the container with the treated workpieces is air-cooled.

Similarly, samples together with said workpieces were treated in the same container in order to form a diffusion layer on their surface. The samples were made of low-alloy cast iron containing additions of chromium, nickel and molybdenum in an amount of 4.5% and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm² | 950 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 11

A composition for diffusion coating ferrous metals is obtained in the following way. Titanium, chromium, alumina, ammonium halide (ammonium bromide), molybdenum and boron, all in powder form, are initial ingredients. Particles of the metallic powders range in size from 0.8 to 1.5 mm. Alumina and ammonium bromide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 59.0 |
| chromium | 20.0 |
| alumina | 17.0 |
| ammonium bromide | 1.5 |
| molybdenum | 1.0 |
| boron | 1.5 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition the diffusion layer on workpieces such as parts of pump casings and parts of housings for column apparatus intended for the production of soda and made of low-alloy cast iron containing additions of chromium, nickel and molybdenum in an amount of 2.5% is formed in the following way. A hermetically sealed container of stainless steel is loaded with workpieces and filled with the composition of the invention. The container is closed, placed into the furnace and heated to a temperature of 1000° C. At this temperature the container contents are held for 7 hours. In the course of heating and holding, a continuous plastic diffusion layer having a total thickness of 0.1 to 0.12 mm is formed on the surface of the workpieces. After holding, the container with the treated workpieces is air-cooled.

Similarly, samples together with said workpieces were treated in the same container in order to form a diffusion layer on their surface. The samples were made of low-alloy cast iron containing additions of chromium, nickel and molybdenum in an amount of 2.5% and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm² | 950 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 12

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 60.0 |
| chromium | 20.0 |
| alumina | 16.0 |
| ammonium chloride | 1.5 |
| molybdenum | 1.2 |
| boron | 1.3 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of medium-alloy cast iron containing additions of chromium, nickel and molybdenum in an amount of 4.5% is formed in the following way. A hermetically sealed container of stainless steel is loaded with workpieces and filled with the composition of the invention. The container is closed, placed into the furnace and heated to a temperature of 1000° C. At this temperature the container contents are held for 6 hours. In the course of heating and holding, a continuous plastic diffusion layer having a thickness of 0.12 mm is being formed on the surface of the workpieces. After holding, the container with the treated workpieces is air-cooled.

Similarly, samples together with said workpieces were treated in the same container in order to form a diffusion layer on their surface. The samples were made of medium-alloy cast iron containing additions of chromium, nickel and molybdenum in an amount of 4.5% and were 65×15×3 mm rectangular plates. After application of the diffusion layer, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer HV, kg/mm$^2$ | 950 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 13

A composition for diffusion coating ferrous metals is obtained in the following way. Titanium, chromium, alumina, ammonium halide (ammonium iodide), molybdenum and boron, all in the powder form, are initial ingredients. Particles of the metallic powders range in size from 0.8 to 1.5 mm. Alumina and ammonium chloride are in powder form with particles of said substances having different dispersion characteristics ranging from a dust-like fraction to particles sizing 1.5 mm. The initial ingredients are taken in the following ratio (in % by weight):

| | |
|---|---|
| titanium | 57.0 |
| chromium | 21.0 |
| alumina | 18.4 |
| ammonium iodide | 1.6 |
| molybdenum | 0.8 |
| boron | 1.2 |

At first, titanium powder and chromium powder are mixed together. Then, molybdenum, boron, ammonium chloride and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of medium-alloy cast iron containing additions of chromium, nickel and molybdenum in an amount of 7.5% is formed in the following way. A hermetically sealed container of stainless steel is loaded with workpieces and filled with the composition of the invention. The container is closed, placed into the furnace and heated to a temperature of 1000° C. At this temperature the container contents are held for 6 hours. In the course of heating and holding, a continuous plastic diffusion layer having a thickness of 0.12 mm is formed on the surface of the workpieces. After holding, the container with the treated workpieces is air-cooled.

Similarly, samples together with said workpieces were treated in the same container in order to form a diffusion layer on their surface. The samples were made of medium-alloy cast iron containing additions of chromium, nickel and molybdenum in an amount of 7.5% and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 980 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |

-continued

| | |
|---|---|
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 14

A composition for diffusion coating ferrous metals is obtained in the following way. Titanium, chromium, alumina, ammonium halide (ammonium fluoride), molybdenum and boron, all in powder form, are initial ingredients. Particles of the metallic powders range in size from 0.8 to 1.5 mm. Alumina and ammonium fluoride are in powder form with particles of said substances having different dispersion characteristics, and ranging from a dust-like fraction to particles sizing 1.5 mm. The initial ingredients are taken in the following ratio (in % by weight):

| | |
|---|---|
| titanium | 55.5 |
| chromium | 22.0 |
| alumina | 19.1 |
| ammonium fluoride | 1.5 |
| molybdenum | 0.9 |
| boron | 1.0 |

At first, titanium powder and chromium powder are mixed together. Then molybdenum, boron, ammonium fluoride and alumina are added into the obtained mixture, whereupon the above ingredients are stirred until a homogeneous mixture is obtained.

With the obtained composition the diffusion layer on workpieces such as parts of pump casings and parts of housings for column apparatus intended for the production of soda and made of medium-alloy cast iron containing additions of chromium, nickel and molybdenum in an amount of 9.8% is formed in the following way. A hermetically sealed container of stainless steel is loaded with the workpieces and filled with the composition of the invention. Then the container is closed, placed into the furnace and heated to a temperature of 1000° C. At this temperature the container contents are held for 6 hours. In the course of heating and holding, a continuous plastic diffusion layer having a thickness of 0.12 mm is formed on the surface of the workpieces. After holding, the container with the treated workpieces is air-cooled.

Similarly, samples together with said workpieces were treated in the same container to form a diffusion layer on their surface. The samples were made of medium-alloy cast iron containing additions of chromium, nickel and molybdenum in an amount of 9.8% and were 65×15×3 mm, rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 1000 |
| layer continuity, number of spots per cm$^2$ | 0 |

-continued

| | |
|---|---|
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 15

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm. Alumina and ammonium chloride are in powder form with particles of said substances having different dispersion characteristics, ranging from a dust-like fraction to particles sizing 1.5 mm. The initial ingredients are taken in the following ratio (in % by weight):

| | |
|---|---|
| titanium | 54.0 |
| chromium | 22.0 |
| alumina | 19.9 |
| ammonium chloride | 1.7 |
| molybdenum | 0.8 |
| boron | 1.1 |

At first, titanium powder and chromium powder are mixed together. Then molybdenum, boron, ammonium chloride and alumina are added into the obtained mixture, whereupon the above ingredients are added until a homogeneous mixture is obtained.

With the obtained composition, the diffusion layer on workpieces such as parts of pump casings and parts of housings for column apparatus intended for the production of soda and made of high-alloy cast iron containing additions of chromium, nickel and molybdenum in an amount of 12.7% is formed in the following way. A hermetically sealed container of stainless steel is loaded with workpieces and filled with the composition of the invention. Then the container is closed, placed into the furnace and heated to a temperature of 1000° C. At this temperature the container contents are held for 6 hours. In the course of heating and holding, a continuous plastic diffusion layer having thickness from 0.07 to 0.1 mm is formed on the surface of the workpieces. After holding, the container with the treated workpieces is air-cooled.

Similarly, samples together with said workpieces were treated in the same container to form a diffusion layer on their surface. The samples were made of high-alloy cast iron containing additions of chromium, nickel and molybdenum in an amount of 12.7% and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm² | 1000 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 16

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm. Alumina and ammonium iodide are in powder form with particles of said substances having different dispersion characteristics and range from a dust-like fraction to particles sizing 1.5 mm. The initial ingredients are taken in the following ratio (in % by weight):

| | |
|---|---|
| titanium | 53.0 |
| chromium | 23.0 |
| alumina | 20.75 |
| ammonium iodide | 1.5 |
| molybdenum | 0.75 |
| boron | 1.0 |

At first, titanium powder and chromium powder are mixed together. Then molybdenum, boron, ammonium iodide and alumina are added until a homogeneous mixture is obtained.

With the obtained composition, the diffusion layer on workpieces such as parts of pump casings and parts of housings for column apparatus intended for the production of soda and made of high-alloy cast iron containing additions of chromium, nickel and molybdenum in an amount of 14.5% is formed in the following way. A hermetically sealed container of stainless steel is loaded with workpieces, and filled with the composition of the present invention. The container is closed, placed into the furnace and heated to a temperature of 1000° C. At this temperature the container contents are held for 6 hours. In the course of heating and holding, a continuous plastic diffusion layer having a thickness from 0.07 to 0.1 mm is being formed on the surface of the workpieces. After holding, the container with the treated work pieces is air-cooled.

Similarly, samples together with said workpieces were treated in the same container to form a diffusion layer on their surface. The samples were made of high-alloy cast iron containing additions of chromium, nickel and molybdenum in an amount of 14.5% and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm² | 1000 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 17

A composition for diffusion coating ferrous metals is obtained in the following way. Titanium, chromium, alumina, ammonium halide (ammonium bromide), molybdenum and boron, all in powder form, are initial ingredients. Particles of the metallic powders range in size from 0.8 to 1.5 mm. Alumina and ammonium bromide are in powder form with particles of said substances having different dispersion characteristics and ranging from dust-like fraction to particles sizing 1.55 mm. The initial ingredients are taken in the following ratio (in % by weight):

| | |
|---|---|
| titanium | 52.0 |
| chromium | 23.5 |
| alumina | 20.3 |
| ammonium bromide | 2.0 |
| molybdenum | 1.0 |
| boron | 1.2 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition, the diffusion layer on workpieces such as parts of pump casings and parts of housings for column apparatus intended for the production of soda and made of high-alloy cast iron containing additions of chromium, nickel and molybdenum in an amount of 13.6% is formed in the following way. A hermetically sealed container of stainless steel is loaded with workpieces, and filled with the composition of the present invention. Then the container is closed, placed into the furnace and heated to a temperature of 1000° C. At this temperature the container contents are held for 6 hours. In the course of heating and holding, a continuous plastic diffusion layer having thickness from 0.07 to 0.1 mm is being formed on the surface of the workpieces. After holding, the container with the treated workpieces is air-cooled.

Similarly, samples together with said workpieces were treated in the same container to form a diffusion layer on their surface. The samples were made of a high-alloy cast iron containing additions of chromium, nickel and molybdenum in an amount of 13.6% and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 1000 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 18

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 54.0 |
| chromium | 17.5 |
| alumina | 15.2 |
| ammonium chloride | 1.5 |
| molybdenum | 0.8 |
| boron | 1.0 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 0.2% carbon content steel is formed in the following way. A hermetically sealed container of stainless steel is loaded with workpieces and filled with the composition of the present invention. The container is closed, placed into the furnace and heated to a temperature of 1100° C. At this temperature the container contents are held for 6 hours. In the course of heating and holding, a continuous plastic diffusion layer having a thickness of 0.25 mm is formed on the surface of the workpieces. After holding, the container with the treated workpieces is air-cooled.

Similarly, samples together with said workpieces were treated in the same container to form a diffusion layer on their surface. The samples were made of 0.2% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 880 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.002 |
| in barium chloride (263 g/l) | 0.002 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 19

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm. Alumina and ammonium iodide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 63.0 |
| chromium | 18.0 |
| alumina | 15.3 |
| ammonium iodide | 1.5 |
| molybdenum | 1.0 |
| boron | 1.2 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 0.3% carbon content steel is formed in the following way. A hermetically sealed container of stainless steel is loaded with workpieces and filled with the composition of the present invention. The container is closed, placed into the furnace and heated to a temperature of 1100° C. At this temperature the container contents are held for 8 hours. In the course of heating and holding, a continuous plastic diffusion layer having a thickness of 0.25 mm is formed on the surface of the workpieces. After holding, the container with the treated workpieces is air-cooled.

Similarly, samples together with said workpieces were treated in the same container to form a diffusion layer on their surfaces. The samples were made of 0.35% carbon content steel and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm² | 880 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.002 |
| in barium chloride (263 g/l) | 0.002 |
| in ammonium chloride (271 g/l) | 0.004 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 20

A composition for diffusion coating ferrous metals is obtained in the following way. Metallic titanium, metallic chromium, alumina, ammonium halide (ammonium bromide), metallic molybdenum and boron, all in powder form, are initial ingredients. Particles of the metallic powders range in size from 0.8 to 1.5 mm. Alumina and ammonium bromide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 62.0 |
| chromium | 18.5 |
| alumina | 15.5 |
| ammonium bromide | 1.7 |
| molybdenum | 1.0 |
| boron | 1.3 |

At first, titanium powder and chromium powder are mixed together. Then molybdenum, boron, ammonium bromide and alumina are added into the obtained mixture, whereupon the above ingredients are stirred until a homogeneous mixture is obtained. With the obtained composition the diffusion layer on the workpieces (such as pump impellers, stirrer paddles, sliding dampers, pipelines) made of 0.45% carbon content steel is formed in the following way. A hermetically sealed container of stainless steel is loaded with workpieces and filled with the composition of the present invention. The container is closed, placed into the furnace and heated to a temperature of 1100° C. At this temperature the container contents are held for 8 hours.

In the course of heating and holding, a continuous plastic diffusion layer is formed on the surface of the workpieces, having a thickness of 0.25 mm.

After holding, the container with the workpieces treated is air-cooled.

Similarly, samples togetheer with said workpieces were treated in the same container to form a diffusion layer on their surface. The samples were made of 0.45% carbon content steel and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm² | 880 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.003 |
| in barium chloride (263 g/l) | 0.003 |
| in ammonium chloride (271 g/l) | 0.006 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 21

A composition for diffusion coating ferrous metals is obtained in the following way. Titanium, chromium, alumina, ammonium halide (ammonium fluoride), molybdenum and boron, all in powder form, are initial ingredients. Particles of the metallic powders range in size from 0.8 to 1.5 mm. Alumina and ammonium fluoride are taken in the powder form with particles of said substances having different dispersion characteristics and ranging from a dust-like fraction to particles sizing 1.5 mm.

The initial ingredients are taken in the following ratio (in % by weight):

| | |
|---|---|
| titanium | 61.0 |
| chromium | 19.0 |
| alumina | 15.8 |
| ammonium fluoride | 1.5 |
| molybdenum | 1.2 |
| boron | 1.5 |

At first, titanium powder and chromium powder are mixed together. The molybdenum, boron, ammonium fluoride and alumina are added into the obtained mixture, whereupon the above ingredients are stirred until a homogeneous mixture is obtained.

With the obtained composition the diffusion layer on workpieces (such as pumps impellers, stirrer paddles, sliding dampers, pipelines) made of 0.58% carbon content steel is formed in the following way. A hermetically sealed container of stainless steel is loaded with workpieces and filled with the composition of the present invention. The container is closed, placed into the furnace and heated to a temperature of 1100° C. At this temperature the container contents are held for 8 hours.

In the course of heating and holding, a continuous plastic diffusion layer having a thickness of 0.25 mm is formed on the surface of the workpieces.

After holding, the container with the treated workpieces is air-cooled.

Similarly, samples together with said workpieces were treated in the same container to form a diffusion layer on their surface. The samples were made of 0.58% carbon content steel and were 65×15×3 mm rectangular plates.

After the diffusion layer has been formed, the samples were subjected to X-ray analysis in order to determine the nature of phases constituting the diffusion layer.

The techniques described in Example 1 were used to determine hardness, continuity and corrosion resistance of the diffusion layer.

The testing yielded the following results:

| | |
|---|---|
| Vickers hardness of the diffusion layer VH, kg/mm² | 890 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.003 |
| in barium chloride (263 g/l) | 0.003 |
| in ammonium chloride (271 g/l) | 0.006 |
| in sodium sulphate (250 g/l) | 0.001 |
| in potassium sulphate (220 g/l) | 0.001 |
| in sodium carbonate (178 g/l) | 0.001 |
| in potassium carbonate (110 g/l) | 0.001 |
| in sodium bicarbonate (88 g/l) | 0.001 |

EXAMPLE 22

A composition for diffusion coating ferrous metals is obtained in the following way. Titanium, chromium, alumina, ammonium halide (ammonium chloride), molybdenum and boron, all in powder form, are initial ingredients. Particles of the metallic powders are ranging in size from 0.8 to 1.5 mm.

Alumina and ammonium chloride are in powder form with particles of said substances having different dispersion characteristics and ranging from a dust-like fraction to particles sizing 1.5 mm.

The initial ingredients are taken in the following ratio (in % by weight):

| | |
|---|---|
| titanium | 82.0 |
| chromium | 18.0 |
| alumina | 15.0 |
| ammonium chloride | 2.0 |
| molybdenum | 1.5 |
| boron | 1.5 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of 0.65% carbon content steel is formed in the following way. A hermetically sealed container of stainless steel is loaded with workpieces and filled with the composition of the present invention. The container is closed, placed into the furnace and heated to a temperature of 1050° C. At this temperature the container contents are held for 7 hours.

In the course of heating and holding, a continuous diffusion layer having thickness of 0.22 to 0.25 mm is formed on the surface of the workpieces.

After holding, the container with the treated workpieces is air-cooled.

Similarly, samples together with said workpieces were treated in the same container to form a diffusion layer on their surface. The samples were made of 0.65% carbon content steel and were 65×15×3 mm rectangular plates.

After the diffusion layer has been formed, the samples were subjected to X-ray analysis in order to determine the nature of phases constituting the diffusion layer.

The techniques described in Example 1 were used to determine hardness, continuity and corrosion resistance of the diffusion layer.

The testing yielded the following results:

| | |
|---|---|
| Vickers hardness of the diffusion layer VH, kg/mm² | 880 |
| layer continuity, number of spots per cm² | 0 |
| corrosion resistance of the diffusion layer, mm/year: | |
| in sodium chloride (310 g/l) | 0.001 |
| in magnesium chloride (250 g/l) | 0.002 |
| in barium chloride (263 g/l) | 0.002 |
| in ammonium chloride (271 g/l) | 0.004 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 23

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm. Alumina and ammonium iodide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 60.0 |
| chromium | 20.0 |
| alumina | 15.0 |
| ammonium iodide | 1.5 |
| molybdenum | 1.5 |
| boron | 2.0 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 0.7% carbon content steel is formed in the following way.

A hermetically sealed container of stainless steel is loaded with workpieces and filled with the composition of the present invention. The container is closed, put into the furnace and heated to a temperature of 1050° C. At this temperature container contents the container is held for 7 hours. In the course of heating and holding, a continuous diffusion layer having a thickness of 0.22 to 0.25 mm is being formed on the surface of the workpieces. After holding, the container with the treated workpieces is air-cooled.

Similarly, samples together with said workpieces were treated in the same container to form a diffusion layer on their surface. The samples were made of 0.7% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 880 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.002 |
| in barium chloride (263 g/l) | 0.002 |
| in ammonium chloride (271 g/l) | 0.004 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 24

A composition for diffusion coating ferrous metals is obtained in the following way. Titanium, chromium, alumina, ammonium halide (ammonium bromide), molybdenum and boron, all in powder form, are initial ingredients. Particles of the metallic powders range in size from 0.8 to 1.5 mm. Alumina and ammonium bromide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 59.0 |
| chromium | 21.0 |
| alumina | 16.0 |
| ammonium bromide | 1.5 |
| molybdenum | 1.0 |
| boron | 1.5 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 0.78% carbon content steel is formed in the following way.

A hermetically sealed container of stainless steel is loaded with workpieces and the composition of the present invention is filled in. The container is closed, put into the furnace and heated to a temperature of 1050° C. At this temperature the container contents are held for 7 hours.

In the course of heating and holding, a continuous diffusion layer having a thickness of 0.22 to 0.25 mm is formed on the surface of the workpieces. After holding, the container with the treated workpieces is air-cooled.

Similarly, samples together with said workpieces were treated in the same container to form a diffusion layer on their surface. The samples were made of 0.78% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 880 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.002 |
| in barium chloride (263 g/l) | 0.002 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 25

A composition for diffusion coating ferrous metals is obtained in the following way. Titanium, chromium, alumina, ammonium halide (ammonium fluoride), molybdenum and boron, all in powder form, are initial ingredients. Particles of the metallic powders range in size from 0.8 to 1.5 mm. Alumina and ammonium fluoride in powder form with particles of said substances having different dispersion characteristics ranging from a dust-like fraction to particles sizing 1.5 mm.

The initial ingredients are taken in the following ratio (in % by weight):

| | |
|---|---|
| titanium | 57.0 |
| chromium | 21.0 |
| alumina | 18.4 |
| ammonium fluoride | 1.5 |
| molybdenum | 0.9 |
| boron | 1.2 |

At first, titanium powder and chromium powder are mixed together. Then molybdenum, boron, ammonium fluoride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 0.85% carbon content steel is formed in the following way.

A hermetically sealed container of stainless steel is loaded with workpieces, and filled with the composition of the present invention. The container is closed, put into the furnace and heated to a temperature of 1050° C. At this temperature the container contents are held for 7 hours. In the course of heating and holding, a continuous diffusion layer having a thickness from 0.22 to 0.25 mm is formed on the surface of the workpieces. After holding, the container with the treated workpieces is air-cooled.

Similarly, samples together with said workpieces were treated in the same container to form a diffusion layer on their surface. The samples were made of 0.85% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| Vickers hardness of the diffusion layer VH, kg/mm$^2$ | 880 |
|---|---|
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.002 |
| in barium chloride (263 g/l) | 0.002 |
| in ammonium chloride (271 g/l) | 0.003 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 26

A composition for diffusion coating ferrous metals is obtained in the following way. Metallic titanium, metallic chromium, alumina, ammonium halide (ammonium chloride), metallic molybdenum and boron, all in powder form, are initial ingredients. Particles of the metallic powders range in size from 0.8 to 1.5 mm. Alumina and ammonium chloride are in powder form with particles of said substances having different dispersion characteristics ranging from a dust-like fraction to particles sizing 1.5 mm.

The initial ingredients are taken in the following ratio (in % by weight):

| titanium | 54.0 |
|---|---|
| chromium | 22.0 |
| alumina | 20.5 |
| ammonium chloride | 1.5 |
| molybdenum | 0.8 |
| boron | 1.2 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of 0.95% carbon content steel is formed in the following way.

A hermetically sealed container of stainless steel is loaded with workpieces, and filled with the composition of the present invention. The container is closed, put into the furnace and heated to a temperature of 1050° C. At this temperature the container contents are held for 7 hours. In the course of heating and holding, a continuous diffusion layer having thickness from 0.25 to 0.28 mm is formed on the surface of the workpieces. After holding, the container with the workpieces treated is air-cooled.

Similarly, samples together with said workpieces were treated in the same container to form a diffusion layer on their surface. The samples were made of 0.95% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| Vickers hardness of the diffusion layer VH, kg/mm$^2$ | 890 |
|---|---|
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 27

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm. Alumina and ammonium iodide are in powder form with particles of said substances having different dispersion characteristics ranging from a dust-like fraction to particles sizing 1.5 mm. The initial ingredients are taken in the following ratio (in % by weight):

| titanium | 53.0 |
|---|---|
| chromium | 23.0 |
| alumina | 19.8 |
| ammonium iodide | 1.5 |
| molybdenum | 1.2 |
| boron | 1.5 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of 1.05% carbon content steel is formed in the following way.

A hermetically sealed container of stainless steel is loaded with workpieces and filled with the composition of the present invention. The container is closed, put into the furnace and heated to a temperature of 1050° C. At this temperature the container contents are held for 7 hours. In the course of heating and holding, a continuous diffusion layer having a thickness of 0.25 to 0.28 mm is formed on the surface of the workpieces. After holding, the container with the workpieces treated is air-cooled.

Similarly, samples together with said workpieces were treated in the same container to form a diffusion layer on their surface. The samples were made of 1.05% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 900 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 28

A composition for diffusion coating ferrous metals is obtained in the following way. Titanium, chromium, alumina, ammonium halide (ammonium bromide), molybdenum and boron, all in powder form, are initial ingredients. Particles of the metallic powders range in size from 0.8 to 1.5 mm. Alumina and ammonium bromide are in powder form with particles of said substances having different dispersion characteristics ranging from a dust-like fraction to particles sizing 1.5 mm. The initial ingredients are taken in the following ratio (in % by weight):

| | |
|---|---|
| titanium | 52.0 |
| chromium | 24.0 |
| alumina | 19.9 |
| ammonium bromide | 1.8 |
| molybdenum | 1.3 |
| boron | 1.0 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 1.1% carbon content steel is formed in the following way. A hermetically sealed container of stainless steel is loaded with workpieces and filled with the composition of the present invention. The container is closed, put into the furnace and heated to a temperature of 1050° C. At this temperature the container contents are held for 7 hours. In the course of heating and holding, a continuous diffusion layer having thickness of 0.25 to 0.28 mm is formed on the surface of the workpieces. After holding, the container with the treated workpieces is air-cooled.

Similarly, samples together with said workpieces were treated in the same container to form a diffusion layer on their surface. The samples were made of 1.1% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 900 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 29

A composition for diffusion coating ferrous metals is obtained in the following way. Titanium, chromium, alumina, ammonium halide (ammonium fluoride), molybdenum and boron, all in powder form, are initial ingredients. Particles of the metallic powders range in size from 0.8 to 1.5 mm. Alumina and ammonium fluoride are in powder form with particles of said substances having different dispersion characteristics ranging from a dust-like fraction to particles sizing 1.5 mm. The initial ingredients are taken in the following ratio (in % by weight):

| | |
|---|---|
| titanium | 51.5 |
| chromium | 23.0 |
| alumina | 21.25 |
| ammonium fluoride | 1.6 |
| molybdenum | 1.5 |
| boron | 1.15 |

At first, titanium powder and chromium powder are mixed together. Then molybdenum, boron, ammonium fluoride and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of 1.15% carbon content steel is formed in the following way.

A hermetically sealed container of stainless steel is loaded with workpieces and filled with the composition of the present invention. The container is closed, put into the furnace and heated to a temperature of 1050° C. At this temperature the container contents are held for 7 hours. In the course of heating and holding, a continuous diffusion layer having a thickness of 0.25 to 0.28 mm is formed on the surface of the workpieces. After holding, the container with the treated workpieces is air-cooled.

Similarly, samples together with said workpieces were treated in the same container to form a diffusion layer on their surface. The samples were made of 1.15% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 900 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 30

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm.

Alumina and ammonium chloride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 63.0 |
| chromium | 18.0 |
| alumina | 15.0 |
| ammonium chloride | 2.0 |
| molybdenum | 1.0 |
| boron | 1.0 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of alloy steel containing 0.1% carbon, 0.6% silicon, 0.6% manganese, 13.0% chromium, 2.5% nickel is formed in the following way.

A hermetically sealed container of stainless steel is loaded with workpieces and filled with the composition of the present invention. The container is closed, put into the furnace and heated to a temperature of 1100° C. At this temperature the container contents are held for 8 hours. In the course of heating and holding, a continuous diffusion layer having a thickness of 0.2 to 0.23 mm is being formed on the surface of the workpieces. After holding, the container with the treated workpieces is air-cooled.

Similarly, samples together with said workpieces were treated in the same container to form a diffusion layer on their surface. The samples were made of alloy steel containing 0.1% carbon, 0.6% silicon, 0.6% manganese, 13.0% chromium, 2.5% nickel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 920 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 31

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm.

Alumina and ammonium iodide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 62.0 |
| chromium | 19.0 |
| alumina | 15.0 |
| ammonium iodide | 1.5 |
| molybdenum | 1.5 |
| boron | 1.0 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of alloy steel containing 0.12% carbon, 0.6% silicon, 0.6% manganese, 13.5% chromium, 2.8% nickel is formed in the following way.

A hermetically sealed container of stainless steel is loaded with workpieces and filled with the composition of the present invention. The container is closed, put into the furnace and heated to a temperature of 1100° C. At this temperature the container contents are held for 8 hours. In the course of heating and holding, a continuous diffusion layer having a thickness of 0.2 to 0.23 mm is formed on the surface of the workpieces. After holding, the container with the workpieces treated is air-cooled.

Similarly, samples together with said workpieces were treated in the same container to form a diffusion layer on their surface. The samples were made of alloy steel containing 0.12% carbon, 0.6% silicon, 0.6% manganese, 13.5% chromium, 2.8% nickel and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 920 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 32

A composition for diffusion coating ferrous metals is obtained in the following way. Metallic titanium, metallic chromium, alumina, ammonium halide (ammonium bromide), metallic molybdenum and boron, all in powder form, are initial ingredients. Particles of the metallic powders range in size from 0.8 to 1.5 mm.

Alumina and ammonium bromide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 61.0 |
| chromium | 19.5 |
| ammonium bromide | 1.5 |
| alumina | 15.8 |
| molybdenum | 1.5 |
| boron | 1.0 |

At first, titanium powder and chromium powder are mixed together. Then molybdenum, boron, ammonium bromide and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of alloy steel containing 0.15% carbon, 0.6% cilicon, 0.6% manganese, 14% chromium, 2.2% nickel is formed in the following way.

A hermetically sealed container of stainless steel is loaded with workpieces and filled with the composition of the present invention. The container is closed, put into the furnace and heated to a temperature of 1100° C. At this temperature the container contents are held for 8 hours. In the course of heating and holding, a continuous diffusion layer having a thickness from 0.2 to 0.23 mm is formed on the surface of the workpieces. After holding, the container with the treated workpieces is air-cooled.

Similarly, samples together with said workpieces were treated in the same container to form a diffusion layer on their surface. The samples were made of alloy steel containing 0.15% carbon, 0.6% silicon, 0.6% manganese, 14% chromium, 2.2% nickel and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 920 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 33

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm.

Alumina and ammonium chloride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 60.0 |
| chromium | 20.0 |
| alumina | 16.3 |
| ammonium chloride | 1.5 |
| molybdenum | 1.2 |
| boron | 1.0 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of alloy steel containing 0.25% carbon, 0.8% silicon, 0.8% manganese, 16.0% chromium, 1.7% nickel is formed in the following way.

A hermetically sealed container of stainless steel is loaded with workpieces and filled with the composition of the present invention. The container is closed, put into the furnace and heated to a temperature of 1100° C. At this temperature the container contents are held for 7 hours. In the course of heating and holding, a continuous diffusion layer having a thickness from 0.23 to 0.25 mm is formed on the surface of the workpieces. After holding, the container with the workpieces treated is air-cooled.

Similarly, samples together with said workpieces were treated in the same container to form a diffusion layer on their surface. The samples were made of alloy steel containing 0.25% carbon, 0.8% silicon, 0.8% manganese, 16.0% chromium, 1.7% nickel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 920 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 34

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm.

Alumina and ammonium iodide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 58.0 |
| chromium | 20.0 |
| alumina | 18.0 |
| ammonium iodide | 1.5 |
| molybdenum | 1.5 |
| boron | 1.0 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of alloy steel containing 0.28% carbon, 0.8% silicon, 0.8% manganese, 16.5% chromium, 2.0% nickel is formed in the following way.

A hermetically sealed container of stainless steel is loaded with workpieces and filled with the composition of the present invention. The container is closed, put into the furnace and heated to a temperature of 1100° C. At this temperature the container contents are held for 7 hours. In the course of heating and holding, a continuous diffusion layer having a thickness from 0.23 to 0.25 mm is formed on the surface of the workpieces. After holding, the container with the treated workpieces is air-cooled.

Similarly, samples together with said workpieces were treated in the same container to form a diffusion layer on their surface. The samples were made of alloy steel containing 0.28% carbon, 0.8% silicon, 0.8% manganese, 16.5% chromium, 2.0% nickel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 950 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 35

A composition for diffusion coating ferrous metals is obtained in the following way. Titanium, chromium, alumina, ammonium halide (ammonium fluoride), molybdenum and boron, all in powder form, are initial ingredients. Particles of the metallic powders range in size from 0.8 to 1.5 mm.

Alumina and ammonium fluoride are in powder form with particles of said substances having different dispersion characteristics and ranging from dust-like fraction to particles sizing 1.5 mm. The initial ingredients are taken in the following ratio (in % by weight):

| | |
|---|---|
| titanium | 56.0 |
| chromium | 20.0 |
| alumina | 19.6 |
| ammonium fluoride | 1.7 |
| molybdenum | 1.4 |
| boron | 1.3 |

At first, titanium powder and chromium powder are mixed together. Then molybdenum, boron, ammonium fluoride and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of alloy steel containing 0.22% carbon, 0.8% silicon, 0.8% manganese, 16.2% chromium, 2.5% nickel is formed in the following way.

A hermetically sealed container of stainless steel is loaded with workpieces and filled with the composition of the present invention. The container is closed, put into the furnace and heated to a temperature of 1100° C. At this temperature the container contents are held for 7 hours. In the course of heating and holding, a continuous diffusion layer having a thickness from 0.23 to 0.25 mm is being formed on the surface of the workpieces. After holding, the container with the treated workpieces is air-cooled.

Similarly, samples together with said workpieces were treated in the same container to form a diffusion layer on their surface. The samples were made of alloy steel containing 0.22% carbon, 0.8% silicon, 0.8% manganese, 16.2% chromium, 2.5% nickel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 950 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 36

A composition for diffusion coating ferrous metals is obtained in the following way. Titanium, chromium, alumina, ammonium halide (ammonium chloride), molybdenum and boron, all in powder form, are initial ingredients. Particles of the metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 55.0 |
| chromium | 23.0 |
| alumina | 17.3 |
| ammonium chloride | 2.0 |
| molybdenum | 1.5 |
| boron | 1.2 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of alloy steel containing 0.8% carbon, 1.2% silicon, 1.65% manganese, 0.3% chromium, 0.3% nickel, 0.3% copper is formed in the following way.

A hermetically sealed container of stainless steel is loaded with workpieces and filled with the composition of the present invention. The container is closed, put into the furnace and heated to a temperature of 1100° C. At this temperature the container contents are held for 7 hours. In the course of heating and holding, a continuous diffusion layer having a thickness from 0.2 to 0.25 mm is formed on the surface of the workpieces. After holding, the container with the treated workpieces is air-cooled.

Similarly, samples together with said workpieces were treated in the same container to form a diffusion layer on their surface. The samples were made of alloy steel containing 0.8% carbon, 1.2% silicon, 1.65% manganese, 0.3% chromium, 0.3% nickel, 0.3% copper and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 1000 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 37

A composition for diffusion coating ferrous metals is obtained in the following way. Titanium, chromium, alumina, ammonium halide (ammonium iodide), molybdenum and boron, all in powder form, are initial ingredients. Particles of the metallic powders range in size from 0.8 to 1.5 mm. Alumina and ammonium iodide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 53.0 |
| chromium | 24.0 |
| alumina | 18.5 |
| ammonium iodide | 1.5 |
| molybdenum | 1.5 |
| boron | 1.5 |

At first, titanium powder and chromium powder are mixed together. Then molybdenum, boron, ammonium iodide and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of alloy steel containing 0.9% carbon, 1.0% silicon, 1.5% manganese, 0.3% chromium, 0.3% nickel, 0.3% copper is formed in the following way.

A hermetically sealed container of stainless is loaded with workpieces and filled with the composition of the present invention. The container is closed, put into the furnace and heated to a temperature of 1100° C. At this temperature the container contents are held for 7 hours. In the course of heating and holding, a continuous diffusion layer having a thickness from 0.2 to 0.25 mm is formed on the surface of the workpieces. After holding, the container with the workpieces treated is air-cooled.

Similarly, samples together with said workpieces were treated in the same container to form a diffusion layer on their surface. The samples were made of alloy steel containing 0.9% carbon, 1.0% silicon, 1.5% manganese, 0.3% chromium, 0.3% nickel, 0.3% copper and were 65×15×3 mm rectangular plates. After application of the diffusion layer the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 1050 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 38

A composition for diffusion coating ferrous metals is obtained in the following way. Titanium, chromium, alumina, ammonium halide (ammonium bromide), molybdenum and boron, all in powder form, are initial ingredients. Particles of metallic powders range in size from 0.8 to 1.5 mm. Alumina and ammonium bromide are in powder form with particles of said substances having different dispersion characteristics and ranging from a dust-like fraction to particles sizing 1.5 mm. The initial ingredients are taken in the following ratio (in % by weight):

| | |
|---|---|
| titanium | 51.5 |
| chromium | 22.0 |
| alumina | 21.25 |
| ammonium bromide | 2.0 |
| molybdenum | 1.5 |
| boron | 1.75 |

At first, titanium powder and chromium powder are mixed together. Then molybdenum, boron, ammonium bromide and alumina are added into the obtained mixture, whereupon the above ingredients are stirred until a homogeneous mixture is obtained. Formation of the diffusion layer with the obtained composition on the workpieces (such as pump impellers, stirrer paddles, sliding dampers, pipelines) made of alloy steel containing 1.2% carbon, 0.9% silicon, 1.3% manganese, 0.3% chromium, 0.3% nickel, 0.3% copper is carried out in the following way.

A hermetically sealed container of stainless steel is loaded with workpieces and filled with the composition of the present invention is filled in. The container is closed, put into the furnace and heated to a temperature of 1100° C. At this temperature the container contents are held for 7 hours. In the course of heating and holding, a continuous diffusion layer having a thickness from 0.2 to 0.25 mm is formed on the surface of the workpieces. After holding, the container with the treated workpieces is air-cooled.

Similarly, samples together with said workpieces were treated in the same container to form a diffusion layer on their surface. The samples were made of alloy steel containing 1.2% carbon, 0.9% silicon, 1.3% manganese, 0.3% chromium, 0.3% nickel, 0.3% copper and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 1100 |
| layer continuity, number of spots per cm$^2$ | 0 |
| corrosion resistance of the diffusion layer, mm/year: | |
| in sodium chloride (310 g/l) | 0.001 |
| in magnesium chloride (250 g/l) | 0.001 |
| in barium chloride (263 g/l) | 0.001 |
| in ammonium chloride (271 g/l) | 0.002 |
| in sodium sulphate (250 g/l) | 0.001 |
| in potassium sulphate (200 g/l) | 0.001 |
| in sodium carbonate (178 g/l) | 0.001 |
| in potassium carbonate (100 g/l) | 0.001 |
| in sodium bicarbonate (88 g/l) | 0.001 |

EXAMPLE 39

A composition for diffusion coating ferrous metals is obtained in the following way. Titanium, chromium, alumina, ammonium halide (ammonium chloride), molybdenum and boron, all in powder form, are initial ingredients. Particles of metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (in % by weight):

| | |
|---|---|
| titanium | 50.0 |
| chromium | 24.0 |
| alumina | 22.0 |
| ammonium chloride | 1.5 |
| molybdenum | 0.5 |
| boron | 2.0 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion later on workpieces (such as pump impellers, stirrer paddles, sliding dampers, pipelines) made of 0.9% carbon content steel is formed in the following way.

A hermetically sealed container of stainless steel is loaded with workpieces, and the composition of the present invention is filled in. The container is closed, put into the furnace and heated to a temperature of 1050° C. At this temperature the container contents are held for 8 hours. In the course of heating and holding, a diffusion layer having a thickness from 0.22 to 0.25 mm is formed on the surface of the workpieces. After holding, the container with the treated workpieces is air-cooled.

Similarly, samples together with said workpieces were treated in the same container to form a diffusion layer on their surface. The samples were made of 0.9% carbon content steel and were 65×15×3 mm rectangular plates.

After the diffusion layer has been formed, the samples were subjected to X-ray analysis in order to determine the nature of phases constituting the diffusion layer. The techniques described in Example 1 were used to determine hardness, continuity and corrosion resistance of the diffusion layer.

The testing yielded the following results:

| | |
|---|---|
| Vickers hardness of the diffusion layer VH, kg/mm$^2$ | 1000 |
| layer continuity, number of spots per cm$^2$ | from 2 to 3 |
| corrosion resistance of the diffusion layer in ammonium chloride (271 g/l), mm/year | 0.055 |

EXAMPLE 40

A composition for diffusion coating ferrous metals is obtained in the following way. Titanium, chromium, alumina, ammonium halide (ammonium chloride), metallic molybdenum and boron, all in powder form, are initial ingredients. Particles of metallic powders range in size from 0.8 to 1.5 mm. Alumina and ammonium chloride are taken in powder form with particles of said substances having different dispersion characteristics and ranging from a dust-like fraction to particles sizing 1.5 mm. The initial ingredients are taken in the following ratio (in % by weight):

| | |
|---|---|
| titanium | 48.0 |
| chromium | 24.0 |
| alumina | 24.6 |
| ammonium chloride | 2.0 |
| molybdenum | 0.6 |
| boron | 0.8 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on the workpieces such as parts of pump casings and parts of housings for column apparatus intended for the production of soda and made of 3.5% carbon content cast iron is formed in the following way. A hermetically sealed container of stainless steel is loaded with workpieces and filled with the composition of the present invention. The container is closed, put into the furnace and heated to a temperature of 1000° C. At this temperature the container contents are held for 8 hours. In the course of heating and holding, a diffusion layer having a thickness of 0.12 mm is formed on the surface of the workpieces. After holding, the container with the treated workpieces is air-cooled.

Similarly, samples together with said workpieces were treated in the same container to form a diffusion layer on their surface. The samples were made of 3.5% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer. Specifically, to determine the corrosion resistance of the diffusion layer, the samples were immersed into an ammonium chloride solution, i.e. the most corrosive medium in this case.

The testing yielded the following results:

| | |
|---|---|
| Vickers hardness of the diffusion layer VH, kg/mm$^2$ | 1200 |
| layer continuity, number of spots per cm$^2$ | from 5 to 6 |
| corrosion resistance of the diffusion layer in ammonium chloride (271 g/l), mm/year | 0.27 |

EXAMPLE 41

A composition for diffusion coating ferrous metals is obtained in the following way. Titanium, chromium, alumina, ammonium halide (ammonium chloride), molybdenum and boron, all in powder form, are initial ingredients. Particles of metallic powders range in size from 0.8 to 1.5 mm. Alumina and ammonium chloride are in powder form with particles of said substances having different dispersion characteristics and ranging from a dust-like fraction to particles sizing 1.5 mm.

The initial ingredients are taken in the following ratio (in % by weight):

| | |
|---|---|
| titanium | 51.0 |
| chromium | 17.0 |
| alumina | 27.3 |
| ammonium chloride | 2.0 |
| molybdenum | 1.0 |
| boron | 1.7 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 1.2% carbon content steel is formed in the following way. A hermetically sealed container of stainless steel is loaded with workpieces and filled with the composition of the present invention. The container is closed, put into the furnace and heated to a temperature of 1050° C. At this temperature the container contents are held for 7 hours. In the course of heating and holding, a diffusion layer having a thickness of 0.25 mm is formed on the surface of the workpieces. After holding, the container with the treated workpieces is air-cooled.

Similarly, samples together with said workpieces were treated in the same container to form a diffusion layer on their surface. The samples were made of 1.2% carbon content steel and were 65×15×3 mm rectangular plates. After the diffusion layer has been formed, the samples were subjected to X-ray analysis in order to determine the nature of phases constituting the diffusion layer. The techniques described in Example 1 were used to determine hardness, continuity and corrosion resistance of the diffusion layer. Specifically, to determine the corrosion resistance of the diffusion layer, the samples were immersed into an ammonium chloride solution, i.e. the most corrosive medium in this case.

The testing yielded the following results:

| Vickers hardness of the diffusion layer VH, kg/mm$^2$ | 950 |
|---|---|
| layer continuity, number of spots per cm$^2$ | from 1 to 2 |
| corrosion resistance of the diffusion layer in ammonium chloride (271 g/l), mm/year | 0.025 |

EXAMPLE 42

A composition for diffusion coating ferrous metals is obtained in the following way. Titanium, chromium, alumina, ammonium halide (ammonium chloride), molybdenum and boron, all in powder form, are initial ingredients. Particles of metallic powders range in size from 0.8 to 1.5 mm. Alumina and ammonium chloride are in powder form with particles of said substances having different dispersion characteristics and ranging from a dust-like fraction to particles sizing 1.5 mm.

The initial ingredients are taken in the following ratio (in % by weight):

| titanium | 65.0 |
|---|---|
| chromium | 25.0 |
| alumina | 4.0 |
| ammonium chloride | 1.5 |
| molybdenum | 2.0 |
| boron | 2.5 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on parts of pump casings and parts of housings for column apparatus intended for the production of soda and made of 3.57% carbon content cast iron castings as well as on 65×15×3 mm rectangular plates made of the same material is formed in the following way. A hermetically sealed container of stainless steel is loaded with workpieces and samples and filled with the composition of the present invention. The container is closed, put into the furnace and heated to a temperature of 950° C. At this temperature the container contents are held for 7 hours. No diffusion layer was formed on the surface of the workpieces and samples because the powders of the mixture sintered.

EXAMPLE 43

A composition for diffusion coating ferrous metals is obtained in the following way. Titanium, chromium, alumina, ammonium halide (ammonium chloride), molybdenum and boron, all in powder form, are initial ingredients. Particles of metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (in % by weight):

| titanium | 70.0 |
|---|---|
| chromium | 17.0 |
| alumina | 9.0 |
| ammonium chloride | 1.5 |
| molybdenum | 1.5 |
| boron | 2.0 |

At first, titanium powder and chromium powder are mixed together. Then molybdenum, boron, ammonium chloride and alumina are added into the obtained mixture, whereupon the above ingredients are stirred until a homogeneous mixture is obtained.

With the obtained composition, the diffusion layer on workpieces (such as pump impellers, stirrer paddles, sliding dampers, pipelines) made of 0.9% carbon content steel as well as on samples (plates) is formed in the following way.

A hermetically sealed container of stainless steel is loaded with workpieces and filled with the composition of the present invention. The container is closed, put into the furnace and heated to a temperature of 1050° C. At this temperature the container contents are held for 7 hours. No diffusion layer was formed on the surface of the workpieces and samples because the powders of the mixture sintered.

EXAMPLE 44

A composition for diffusion coating ferrous metals is obtained in the following way. Titanium, chromium, alumina, ammonium halide (amonium chloride), molybdenum and boron, all in powder form, are initial ingredients. Particles of metallic powders range in size from 0.8 to 1.5 mm. Alumina and ammonium chloride are in powder form with particles of said substances having different dispersion characteristics and ranging from a dust-like fraction to particles sizing 1.5 mm. The initial ingredients are taken in the following ratio (in % by weight):

| titanium | 50.0 |
|---|---|
| chromium | 20.0 |
| alumina | 23.0 |
| ammonium chloride | 2.0 |
| molybdenum | 2.0 |
| boron | 3.0 |

At first, titanium powder and chromium powder are mixed together. The molybdenum, boron, ammonium chloride and alumina are added into the obtained mixture, whereupon the above ingredients are stirred until a homogeneous mixture is obtained.

With the obtained composition the diffusion layer on workpieces (such as pump impellers, stirrer paddles, sliding dampers, pipelines) made of 0.9% carbon content steel as well as on samples (plates) is carried out in the following way. A hermetically sealed container of stainless steel is loaded with workpieces and samples, and filled with the composition of the present invention. The container is closed, put into the furnace and heated to a temperature of 1050° C. At this temperature the container contents are held for 7 hours. In the course of heating and holding, a diffusion layer is formed on the surface of the workpieces and samples. The diffusion layer is characterized by a structural rupture because of a high amount of molybdenum and boron in the composition.

While particular embodiments of the invention have been shown and described, various modifications thereof will be apparent to those skilled in the art and therefore it is not intended that the invention be limited to the disclosed embodiments or to the details thereof and departures may be made therefrom within the spirit and scope of the invention as defined in the claims.

We claim:

1. A composition for diffusion coating ferrous metals, containing a particulate mixture of titanium in an amount of 51.5 to 64.0% by weight, chromium in an amount of 17.5 to 24.0% by weight, alumina in an amount of 15.0 to 21.25% by weight, an ammonium halide in an amount of 1.5 to 2.0% by weight, molybdenum in an amount of 0.75 to 1.5% by weight and boron in an amount of 1.0 to 2.0% by weight.

2. In a method which comprises protecting ferrous metals against corrosion by forming a diffusion coating thereon, said diffusion coating comprising titanium, chromium, alumina and an ammonium halide, the improvement which comprises applying a diffusion coating comprising a particulate mixture of titanium in an amount of 51.5 to 64.0% by weight, chromium in an amount of 17.5 to 24.0% by weight, alumina in an amount of 15.0 to 21.25% by weight, an ammonium halide in an amount of 1.5 to 2.0% by weight, molybdenum in an amount of 0.75 to 1.5% by weight and boron in an amount of 1.0 to 2.0% by weight.

3. The method of claim 2 wherein the diffusion temperature varies from 900°–1100° C.

4. The composition of claim 1, wherein said ammonium halide is selected from the group consisting of ammonium chloride, ammonium iodide, ammonium bromide, and ammonium fluoride.

5. The method of claim 2, wherein said ammonium halide is selected from the group consisting of ammonium chloride, ammonium iodide, ammonium bromide, and ammonium fluoride.

* * * * *